(12) United States Patent
Fukumoto et al.

(10) Patent No.: US 10,864,912 B2
(45) Date of Patent: Dec. 15, 2020

(54) VEHICLE STATE DETERMINATION DEVICE AND VEHICLE STATE DETERMINATION METHOD

(71) Applicant: Panasonic Intellectual Property Management Co., Ltd., Osaka (JP)

(72) Inventors: Satoshi Fukumoto, Tokyo (JP); Takafumi Tokuhiro, Kanagawa (JP); Ichiro Yamane, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 184 days.

(21) Appl. No.: 16/080,440

(22) PCT Filed: Feb. 13, 2017

(86) PCT No.: PCT/JP2017/005049
§ 371 (c)(1),
(2) Date: Aug. 28, 2018

(87) PCT Pub. No.: WO2017/169183
PCT Pub. Date: Oct. 5, 2017

(65) Prior Publication Data
US 2019/0061749 A1   Feb. 28, 2019

(30) Foreign Application Priority Data
Mar. 29, 2016   (JP) .................. 2016-065443

(51) Int. Cl.
*B60R 21/00* (2006.01)
*G08G 1/01* (2006.01)
(Continued)

(52) U.S. Cl.
CPC ......... *B60W 30/0956* (2013.01); *B60R 21/00* (2013.01); *B60W 30/08* (2013.01);
(Continued)

(58) Field of Classification Search
None
See application file for complete search history.

(56) References Cited

U.S. PATENT DOCUMENTS

| | | | |
|---|---|---|---|
| 8,954,252 B1* | 2/2015 | Urmson | G08G 1/166 |
| | | | 180/167 |
| 2015/0066350 A1* | 3/2015 | Iwata | G01C 21/3697 |
| | | | 701/400 |
| 2016/0114800 A1 | 4/2016 | Shimizu | |

FOREIGN PATENT DOCUMENTS

| | | |
|---|---|---|
| JP | 2011-198142 | 10/2011 |
| WO | 2014/192370 | 12/2014 |

OTHER PUBLICATIONS

International Search Report of PCT application No. PCT/JP2017/005049 dated May 9, 2017.
(Continued)

*Primary Examiner* — Redhwan K Mawari
*Assistant Examiner* — Melanie J Patrick
(74) *Attorney, Agent, or Firm* — Greenblum & Bernstein, P.L.C.

(57) ABSTRACT

A vehicle state determination device includes an input unit and a controller. The input unit receives sidewalk information indicating a state of a sidewalk region which a moving body passes through and roadway information indicating a state of a roadway region adjacent to the sidewalk region. The controller determines whether or not a sidewalk entering operation is possible based on the sidewalk information and the roadway information. The sidewalk entering operation is an operation in which a vehicle trying to enter the roadway region by crossing the sidewalk region enters the sidewalk region.

12 Claims, 6 Drawing Sheets

(51) Int. Cl.
*G08G 1/16* (2006.01)
*B60W 30/095* (2012.01)
*B60W 50/14* (2020.01)
*B60W 30/08* (2012.01)
*B60W 30/18* (2012.01)
*G05D 1/00* (2006.01)
*G06K 9/00* (2006.01)

(52) U.S. Cl.
CPC ...... *B60W 30/18154* (2013.01); *B60W 50/14* (2013.01); *G05D 1/0088* (2013.01); *G06K 9/00805* (2013.01); *G08G 1/01* (2013.01); *G08G 1/16* (2013.01); *G08G 1/163* (2013.01); *G08G 1/166* (2013.01); *G05D 2201/0213* (2013.01)

(56) References Cited

OTHER PUBLICATIONS

Office Action from Japan Patent Office (JPO) in Japanese Patent Appl. No. 2016-065443, dated Nov. 5, 2019, together with an English language translation.

\* cited by examiner

VEHICLE STATE DETERMINATION DEVICE AND VEHICLE STATE DETERMINATION METHOD

This application is a U.S. national stage application of the PCT International Application No. PCT/JP2017/005049 filed on Feb. 13, 2017, which claims the benefit of foreign priority of Japanese patent application 2016-065443 filed on Mar. 29, 2016, the contents all of which are incorporated herein by reference.

TECHNICAL FIELD

The present disclosure relates to a vehicle state determination device, a vehicle state determination method, and a vehicle state determination program that determine a state of a vehicle trying to enter a roadway region by crossing a sidewalk region.

BACKGROUND ART

In recent years, in relation to driving support, practical application of an automatic traveling vehicle, and the like, a technology of automatically determining a state of a vehicle is under development. For example, PTL 1 discloses a technology of determining whether or not a vehicle trying to cross a stop prohibited region may stop in the region, based on a road state before and after the stop prohibited region. Such a conventional technology makes it possible to determine a possibility that a traveling vehicle stops in the stop prohibited region and to take appropriate measures to reduce the possibility.

CITATION LIST

Patent Literature

PTL 1: Unexamined Japanese Patent Publication No. 2011-198142

SUMMARY OF THE INVENTION

However, a state of a vehicle to be determined includes various things other than the possibility of the vehicle stopping in the stop prohibited region. For example, when a vehicle tries to enter a roadway by crossing a sidewalk from a parking lot, if such a state determination is made as to allow rapid crossing with minimum hindrance to passage of a pedestrian and the like on the sidewalk, convenience of the vehicle can be improved. Therefore, a technology is desired that enables a vehicle to cross a sidewalk region as quickly as possible with minimum hindrance to passage of a pedestrian and the like (hereinafter, referred to as a "moving body") in a region, such as a sidewalk or a side strip (hereinafter, referred to as a "sidewalk region").

The present disclosure aims at providing a vehicle state determination device, a vehicle state determination method, and a vehicle state determination program that enable a vehicle to cross a sidewalk region quickly with minimum hindrance to passage of a moving body in the sidewalk region.

The vehicle state determination device of the present disclosure is the one that determines a state of a vehicle trying to enter a roadway region adjacent to a sidewalk region by crossing the sidewalk region in which the moving body passes through, and has a following configuration. That is, the vehicle state determination device of the present disclosure includes an input unit that receives sidewalk information indicating a state of the sidewalk region and roadway information indicating a state of the roadway region, and a controller that determines whether or not a sidewalk entering operation in which a vehicle enters the sidewalk region is possible, based on the sidewalk information and the roadway information, and outputs a predetermined control signal that controls an operation of the vehicle depending on whether or not the sidewalk entering operation is possible.

The vehicle state determination method of the present disclosure is a vehicle state determination method that determines a state of a vehicle trying to enter a roadway region adjacent to a sidewalk region by crossing the sidewalk region in which the moving body passes through, and has following steps. That is, the method includes a step of receiving sidewalk information indicating a state of the sidewalk region and roadway information indicating a state of the roadway region, and a step of determining whether or not a sidewalk entering operation in which a vehicle enters the sidewalk region is possible, based on the sidewalk information and the roadway information, and a step of outputting a predetermined control signal that controls an operation of the vehicle depending on whether or not the sidewalk entering operation is possible.

The vehicle state determination program of the present disclosure is the one that determines a state of a vehicle trying to enter a roadway region adjacent to a sidewalk region by crossing the sidewalk region in which the moving body passes through, and makes following processing be executed. That is, the program causes a computer to execute processing of receiving sidewalk information indicating a state of the sidewalk region and roadway information indicating a state of the roadway region, and processing of determining whether or not a sidewalk entering operation in which a vehicle enters the sidewalk region is possible, based on the sidewalk information and the roadway information, and processing of outputting a predetermined control signal that controls an operation of the vehicle depending on whether or not the sidewalk entering operation is possible.

The present disclosure enables a vehicle to cross a sidewalk region quickly with minimum hindrance to passage of a moving body in the sidewalk region.

DESCRIPTION OF EMBODIMENT

Hereinafter, an exemplary embodiment of the present disclosure will be described in detail with reference to the drawings.

<Overview of Device>

First, a use environment of a vehicle state determination device according to the present exemplary embodiment and an overview of functions exhibited by the device in such an environment will be described.

Figure 1:
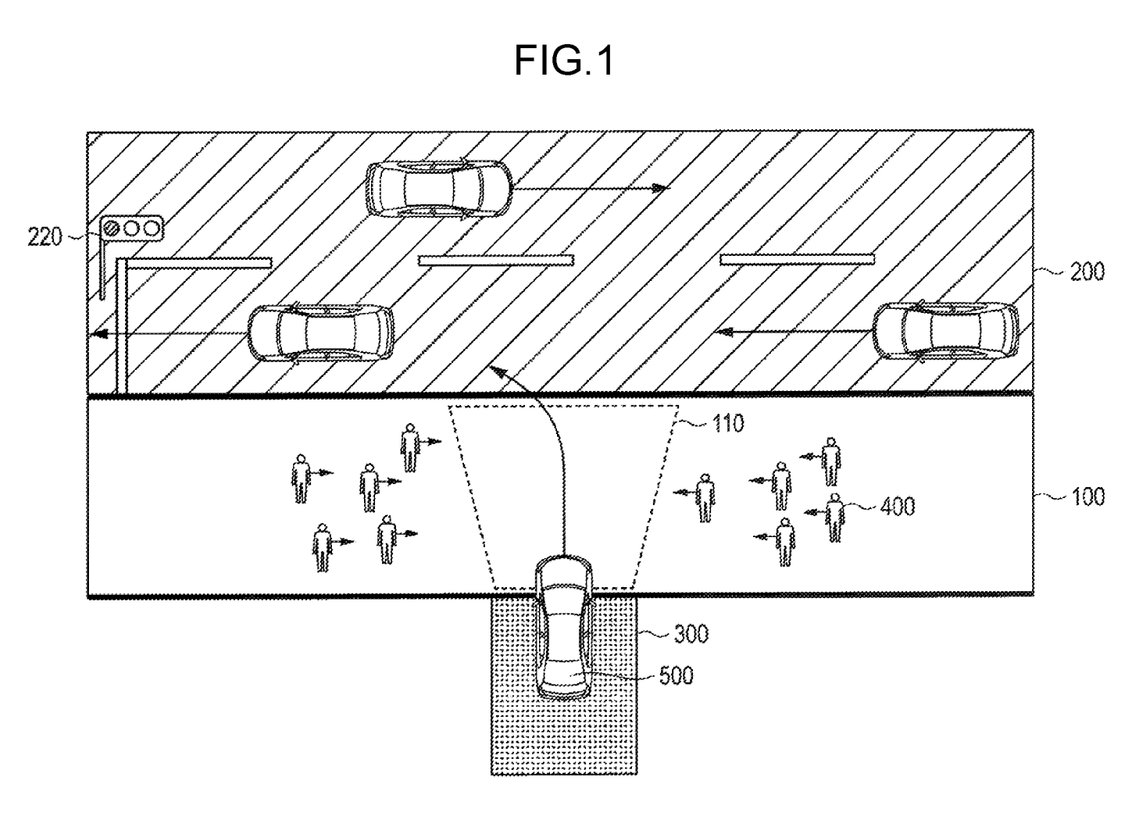
FIG. 1 is a first diagram that illustrates one example of a use environment of a vehicle state determination device according to the present exemplary embodiment.
Figure 2:
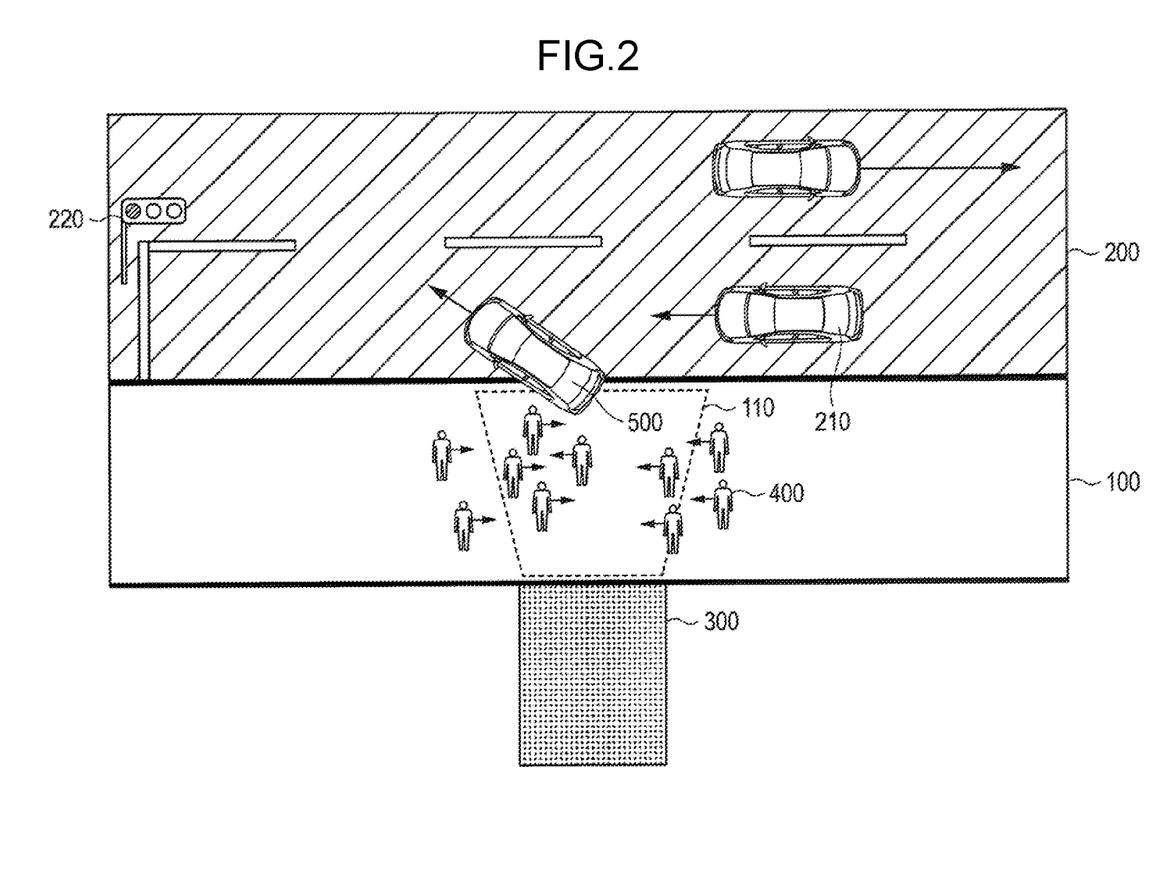
FIG. 2 is a second diagram that illustrates one example of the use environment of the vehicle state determination device according to the present exemplary embodiment.
Figure 3:
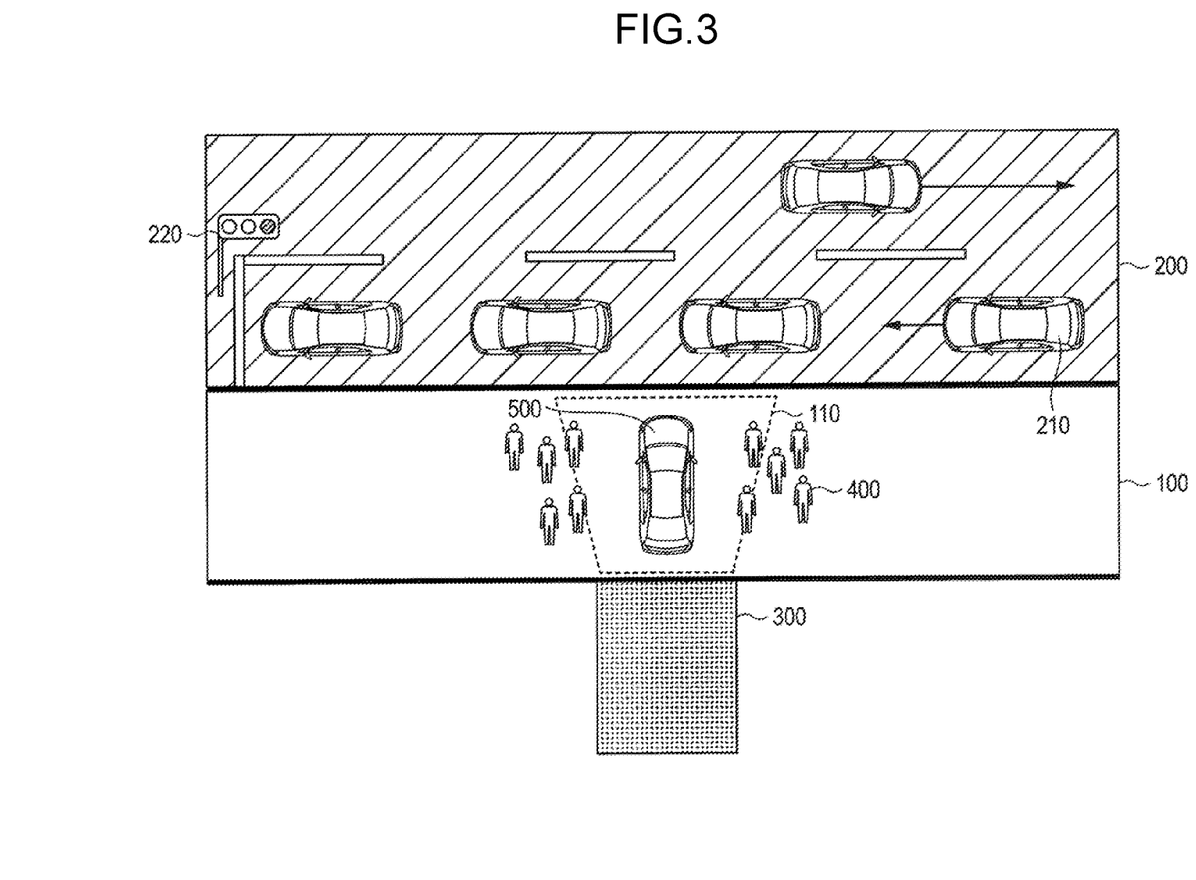
FIG. 3 is a third diagram that illustrates one example of the use environment of the vehicle state determination device according to the present exemplary embodiment.

FIG. 1 to FIG. 3 are diagrams that illustrate one example of the use environment of the vehicle state determination device according to the present exemplary embodiment.

As shown in FIG. 1, there exist sidewalk region 100, roadway region 200 located adjacent to one side of sidewalk region 100, and stopping region 300 located adjacent to the other side of sidewalk region 100. Sidewalk region 100 is a region where moving bodies 400, such as a pedestrian, a bicycle, and a wheelchair mainly pass through, such as a sidewalk, a side strip, and a cycle road. Roadway region 200 is a region where automobiles mainly pass through, such as a roadway. Stopping region 300 is a region where vehicle 500, such as an automobile trying to enter roadway region 200 by crossing sidewalk region 100, stops immediately before starting crossing, and is, for example, a parking lot.

Here, a region including a region that vehicle 500, after crossing sidewalk region 100, will pass and its vicinity is defined as passing scheduled region 110. Passing scheduled region 110 is a region where it is desirable that when at least vehicle 500 departs from stopping region 300, moving bodies 400 do not exist. In addition, passing scheduled region 110 is a region determined based on moving speeds of vehicle 500 and each moving body 400 and a safety distance to be secured between vehicle 500 and each moving body 400.

Note that, passing scheduled region 110, for example, has a shape in which a width becomes wider with the increase of distance from stopping region 300. This is because time elapses while vehicle 500 crosses sidewalk region 100 and moving bodies 400 move during the lapse of time to get closer to vehicle 500. However, the shape and size of passing scheduled region 110 are not limited to an example shown in FIG. 1 or the like.

As shown in FIG. 1, when moving bodies 400 do not exist in passing scheduled region 110, vehicle 500 can pass sidewalk region 100 quickly without hindrance to passage of moving bodies 400. Then, as shown in FIG. 2, when it is easy for a vehicle to enter roadway region 200, vehicle 500 can quickly enter roadway region 200 and exit from sidewalk region 100 (complete crossing of sidewalk region 100). A state in which a vehicle easily enters roadway region 200 is, for example, a state in which a plurality of other vehicles 210 existing in roadway region 200 are traveling smoothly with a sufficient distance between vehicles.

However, as shown in FIG. 3, since nearby traffic signal 220 indicates a red signal, many other vehicles 210 stop with small distances between vehicles, for example, to bring about a state where a vehicle is hard to enter roadway region 200. In such a case, vehicle 500, even if having entered sidewalk region 100, stops before reaching roadway region 200 and waits for a change of state of roadway region 200. Then, passage of moving bodies 400 having arrived at passing scheduled region 110 during this period is hindered by stopping vehicle 500. That is, vehicle 500 cannot complete crossing of sidewalk region 100, and moving bodies 400 are hindered from passing through sidewalk region 100. Such a state may continue over a very long time depending on the state of roadway region 200.

Thus, in order to improve such a state, the vehicle state determination device according to the present exemplary embodiment is mounted in vehicle 500. Such a vehicle state determination device is a device that determines a state of vehicle 500 and thereby enables vehicle 500 to cross sidewalk region 100 quickly with minimum hindrance to passage of moving body 400 in sidewalk region 100.

Figure 4:
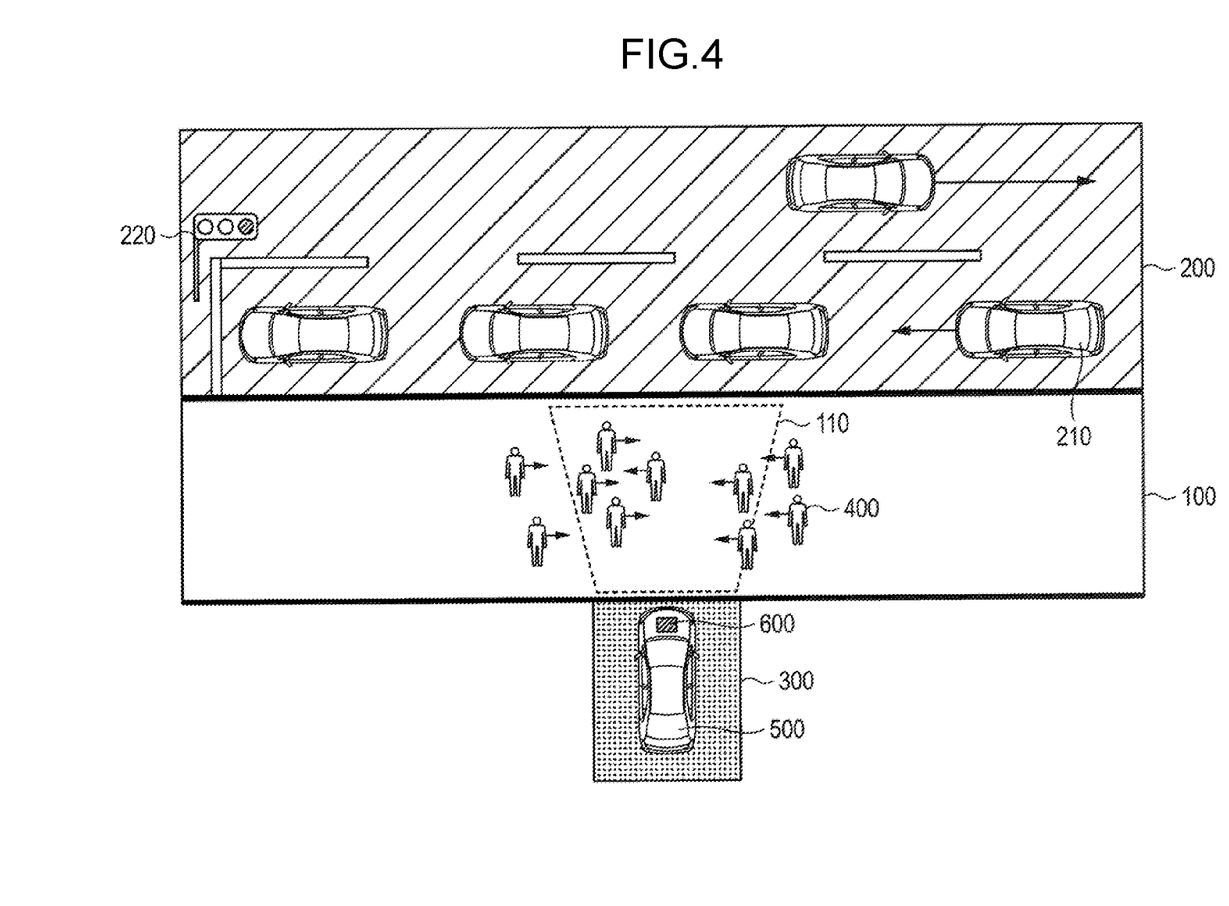
FIG. 4 is a diagram that illustrates one example of a function of the vehicle state determination device according to the present exemplary embodiment.

FIG. 4 is a diagram that illustrates one example of functions of the vehicle state determination device.

As shown in FIG. 4, vehicle state determination device 600 according to the present exemplary embodiment is a device mounted in vehicle 500. Vehicle state determination device 600 is, for example, a device communicably connected to an engine control unit (ECU, not shown) of vehicle 500 or a device built in ECU.

Vehicle state determination device 600 determines whether or not a sidewalk entering operation in which vehicle 500 enters sidewalk region 100 is possible, based on sidewalk information indicating a state of sidewalk region 100 and roadway information indicating a state of roadway region 200. Then, vehicle state determination device 600 outputs a predetermined control signal that controls an operation of vehicle 500 depending on whether or not the sidewalk entering operation is possible. That is, vehicle state determination device 600 determines whether or not vehicle 500 can enter sidewalk region 100, based on both a state of sidewalk region 100 and a state of roadway region 200.

For example, vehicle state determination device 600 determines that the sidewalk entering operation is possible under the condition that an estimation value of the minimum time (hereinafter, referred to as "estimated crossing time") from entry of vehicle 500 into sidewalk region 100 until exit from sidewalk region 100 is less than or equal to a first threshold (for example, 1 minute). In other words, vehicle state determination device 600 determines that the sidewalk entering operation is possible under the condition that vehicle 500 easily enters roadway region 200.

Thus, in a case where vehicle 500, even if having entered sidewalk region 100, cannot enter roadway region 200 quickly, as shown in FIG. 4, it is possible to make vehicle 500 stand by in stopping region 300 without hindrance to passage of moving bodies 400.

<Configuration of Device>

A configuration of vehicle state determination device 600 will be described below.

Figure 5:
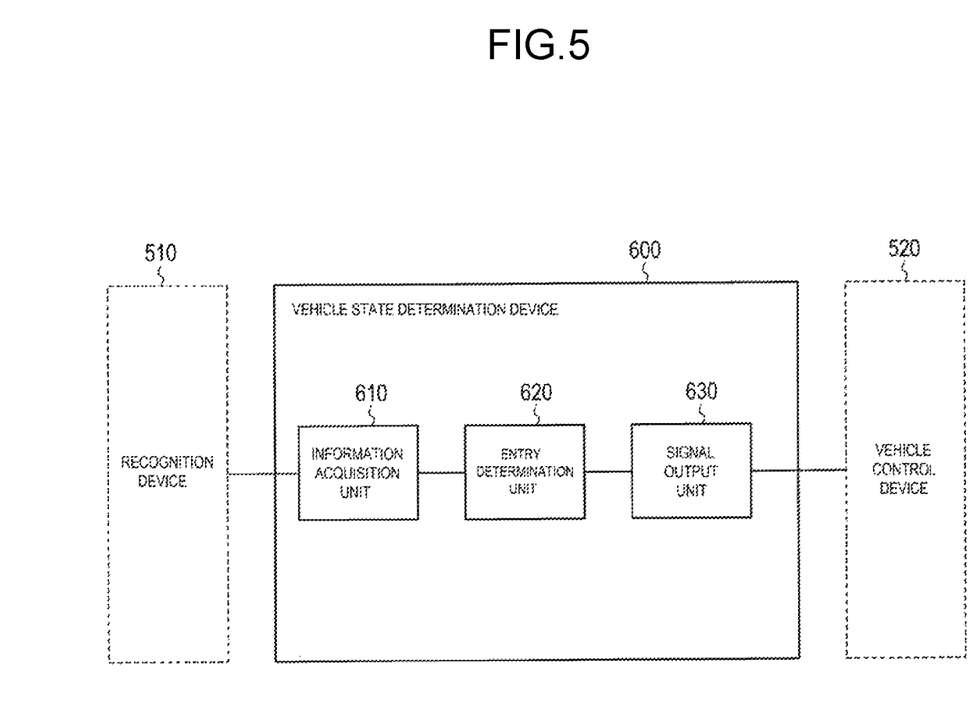
FIG. 5 is a block diagram that illustrates one example of a configuration of the vehicle state determination device according to the present exemplary embodiment.

FIG. 5 is a block diagram that illustrates one example of the configuration of vehicle state determination device 600. Note that, in FIG. 5, a configuration of a periphery of vehicle state determination device 600 will be also shown.

In FIG. 5, vehicle state determination device 600 has information acquisition unit 610, entry determination unit 620, and signal output unit 630.

Information acquisition unit 610 acquires information (hereinafter referred to as "sidewalk information") indicating arrangement of one or a plurality of moving bodies 400 existing in sidewalk region 100, and outputs the acquired sidewalk information to entry determination unit 620. Note that, the sidewalk information preferably indicates locations, moving directions, and moving speeds of moving bodies 400 at least at the current or past time for each of moving bodies 400 existing in sidewalk region 100.

Information acquisition unit 610 acquires information (hereinafter referred to as "roadway information") indicating arrangement of one or a plurality of other vehicles 210 existing in roadway region 200, and outputs the acquired roadway information to entry determination unit 620. Note that, the roadway information preferably indicates at least one of a location, a moving direction, and a moving speed of each of other vehicles 210, distances between vehicles and density of the plurality of other vehicles 210 in roadway region 200, and an indication state of traffic signal 220 disposed in roadway region 200. The roadway information is used to estimate or calculate the above-mentioned estimated crossing time.

Information acquisition unit 610 acquires, for example, information output from recognition device 510 mounted in vehicle 500 as the sidewalk information and/or the roadway information. Recognition device 510 includes a sensor that detects moving bodies 400 and/or other vehicles 210 (hereinafter, collectively referred to as "objects" appropriately), such as a millimeter-wave radar, a camera, and a sonar, and outputs a detection result. Alternatively, recognition device 510 includes a communication device that acquires, from a system that manages location information of objects, such as a dynamic map, the location information and outputs it. That is, as an acquisition method of the sidewalk information and/or the roadway information of information acquisition unit 610, well-known object detection technique or object distribution acquisition technique can be adopted.

Entry determination unit 620, based on the sidewalk information and the roadway information, acquires, by estimation or calculation, the above-mentioned estimated crossing time in a case where vehicle 500 has entered sidewalk region 100 at a certain timing. Then, entry determination unit 620 determines whether or not the acquired estimated crossing time is less than or equal to the first threshold, and determines that the sidewalk entering operation is possible at the above timing under the condition that the estimated crossing time is less than or equal to the first threshold. Note that, entry determination unit 620 changes the first threshold depending on an estimation value of a number of moving bodies 400 the passage of which is hindered by the above sidewalk entering operation. The detail of the acquisition method of the estimated crossing time and the method of determining whether or not the sidewalk entering operation is possible will be described below.

Signal output unit 630 generates a control signal that instructs the sidewalk entering operation to vehicle 500 under the condition that the sidewalk entering operation is possible, and outputs it to vehicle control device 520 mounted in vehicle 500. Further, signal output unit 630 generates a control signal that instructs a temporary prohibition of the sidewalk entering operation to vehicle 500 under the condition that the sidewalk entering operation is not possible (incapable), and outputs it to vehicle control device 520 mounted in vehicle 500. Vehicle control device 520 is, for example, a device that controls automatic traveling including at least automatic forward movement of vehicle 500.

Note that, vehicle control device 520, even in a case of having received the control signal that instructs the sidewalk entering operation, preferably does not perform the sidewalk entering operation in a case of having determined not to perform the sidewalk entering operation, based on another determination criterion (for example, in a case where there is a fear of colliding with moving body 400).

Note that, information acquisition unit 610 described above can be grasped as an input unit that receives sidewalk information indicating a state of sidewalk region 100 and roadway information indicating a state of roadway region 200. In addition, entry determination unit 620 and signal output unit 630 described above can be grasped as a controller that determines whether or not the sidewalk entering operation of vehicle 500 is possible based on the sidewalk information and the roadway information, and outputs a predetermined control signal that controls an operation of vehicle 500 depending on whether or not the sidewalk entering operation is possible.

Further, vehicle state determination device 600, not shown in the figure, for example, has a central processing unit (CPU), a storage medium, such as a read only memory (ROM) storing a control program, a working memory, such as a random access memory (RAM), and a communication circuit. In this case, a function of each unit described above is achieved by the CPU executing the control program.

According to such vehicle state determination device 600, it is possible to prohibit the sidewalk entering operation when there is a high possibility that vehicle 500 stops before reaching roadway region 200 to hinder passage of moving bodies 400, while promoting the sidewalk entering operation of vehicle 500.

<Operation of Device>

Next, an operation of the vehicle state determination device will be described.

Figure 6:
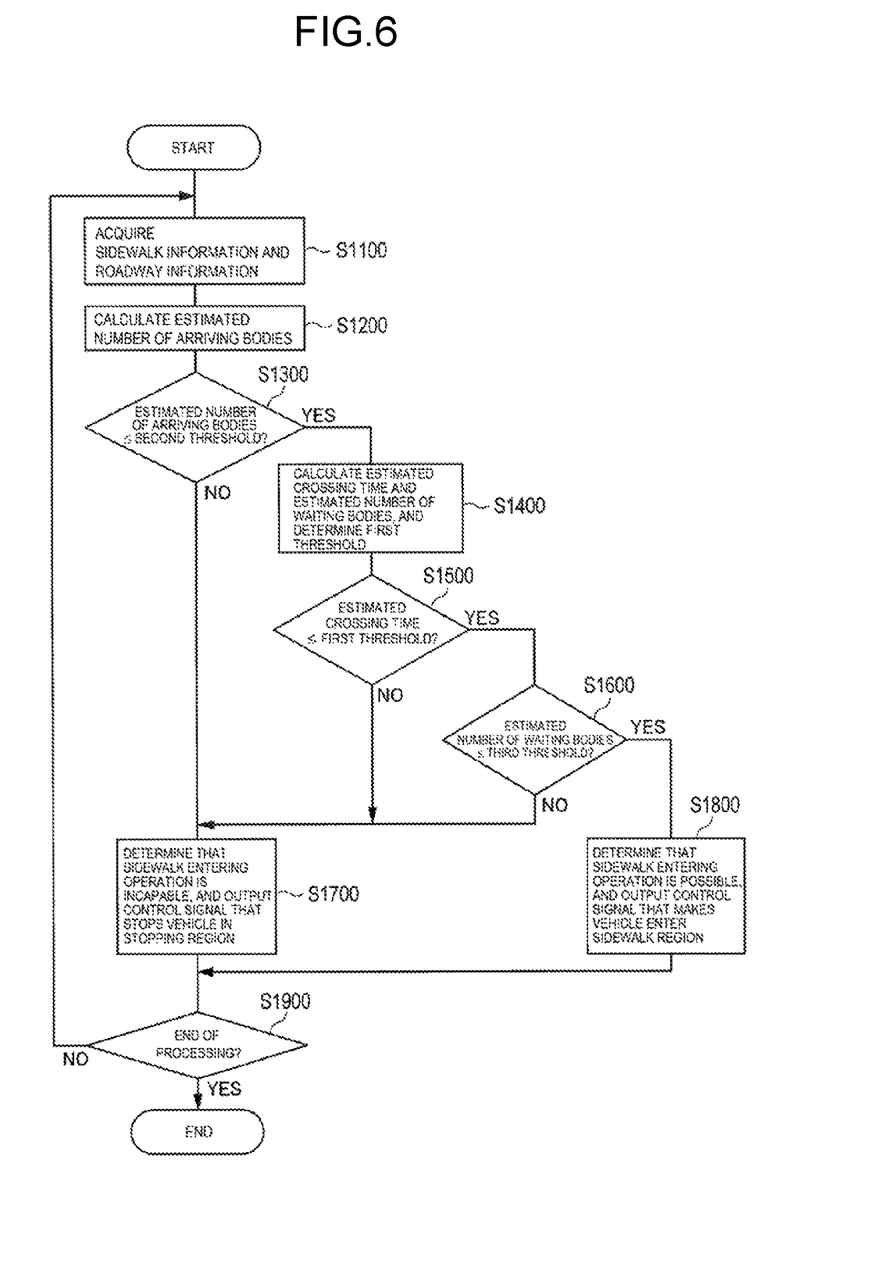
FIG. 6 is a flowchart that illustrates one example of an operation of the vehicle state determination device according to the present exemplary embodiment.

FIG. 6 is a flowchart that illustrates one example of the operation of vehicle state determination device 600. Vehicle state determination device 600, for example, performs an operation described below while vehicle 500 is located in stopping region 300. Passing scheduled region 110 described above is, for example, set by entry determination unit 620, based on a location and a direction of vehicle 500 in stopping region 300. In addition, whether or not vehicle 500 tries to enter road region 200 by crossing sidewalk region 100 is, for example, determined in information acquisition unit 610 by acquisition and analysis of map information indicating a surrounding environment of vehicle 500, vehicle information indicating an operating state of vehicle 500, and sidewalk information.

Note that, vehicle state determination device 600 can grasp a region where vehicle 500 is located as new stopping region 300 at each time point from start until end of crossing of sidewalk region 100 by vehicle 500. Vehicle state determination device 600 can also grasp a remaining region of passing scheduled region 110 located ahead of vehicle 500 as new passing scheduled region 110. In this case, vehicle state determination device 600 performs, for example, an operation described below until vehicle 500 completes crossing of sidewalk region 100.

In addition, in the present exemplary embodiment, the current time may be a (future) time later than a correct current time by a predetermined time. Such a predetermined time is, for example, a time required for vehicle 500 to start the sidewalk entering operation after information acquisition unit 610 acquires the information.

In step S1100, information acquisition unit 610 acquires the sidewalk information and the roadway information.

In step S1200, entry determination unit 620, based on the sidewalk information, calculates an estimation value (hereinafter, referred to as an "estimated number of arriving bodies") of a number of moving bodies 400 arriving at passing scheduled region 110 of sidewalk region 100 while vehicle 500 crosses sidewalk region 100 without stopping, in a case where vehicle 500 has started crossing of sidewalk region 100 at the current time. The estimated number of arriving bodies is, namely, an estimation value of a number of moving bodies 400 the passage of which is hindered by the crossing in a case where vehicle 500 has started crossing of sidewalk region 100 at the current time and has quickly entered roadway region 200.

Note that, the estimated number of arriving bodies can be calculated, for example, based on a time (for example, 5 seconds) preset as a time required for vehicle 500 to cross sidewalk region 100 without stopping, a distance between each moving body 400 and passing scheduled region 110, and an approaching speed of each moving body 400 to passing scheduled region 110.

In step S1300, entry determination unit 620 determines whether or not the estimated number of arriving bodies thus calculated is less than or equal to a preset second threshold (for example, zero). Entry determination unit 620 advances processing to step S1700 described below, in a case where the estimated number of arriving bodies exceeds the second threshold (NO in step S1300). Further, entry determination unit 620 advances processing to step S1400, in a case where the estimated number of arriving bodies is less than or equal to the second threshold (YES in step S1300).

In step S1400, entry determination unit 620 calculates an estimated crossing time based on the roadway information. The estimated crossing time is, namely, in a case where vehicle 500 has started crossing of sidewalk region 100 at the current time, an estimation value of a minimum time required for vehicle 500 from entry to until exit from sidewalk region 100, and is a value obtained by adding, to the minimum time, a time required for vehicle 500 to stay in sidewalk region 100 due to a state of roadway region 200.

Entry determination unit 620, for example, calculates, from the roadway information, an average of time intervals during which other vehicles 210 pass an entry location to roadway region 200 (hereinafter, simply referred to as an "entry location") of vehicle 500. Then, entry determination unit 620 determines, as the estimated crossing time, the minimum time required to cross sidewalk region 100 when the calculated value is not less than a predetermined value, that is, when roadway region 200 is sufficiently empty. That is, entry determination unit 620 determines that the time to stay in sidewalk region 100 is almost close to zero. On the other hand, when the average of the time intervals is less than the predetermined value, entry determination unit 620 determines, as the estimated crossing time, for example, a predetermined minimum waiting time preliminarily determined for each average of the time intervals. Such a predetermined minimum waiting time is a value preliminarily acquired, for example, by experiments, statistics, or the like.

In addition, entry determination unit 620, for example, in a case where a time between vehicles having a predetermined value or more (a value obtained by converting a distance between vehicles into a time) exists after other vehicle 210 first located at or arriving at the entry location after the current time, estimates or calculates a minimum time until other vehicle 210 in question passes the entry location. Then, entry determination unit 620 determines the acquired time as the estimated crossing time.

Further, entry determination unit 620, for example, when traffic signal 220 existing ahead of the entry location indicates a red signal, and the entry location is blocked by other vehicle 210, calculates a time obtained by adding, to a time during which traffic signal 220 changes the red signal to a blue signal, a time from the change to the blue signal until other vehicle 210 in question begins to move. Then, entry determination unit 620 determines the calculated time as the estimated crossing time.

In addition, entry determination unit 620, based on the estimated crossing time thus calculated, calculates an estimation value (hereinafter, referred to as an "estimated number of waiting bodies") of a number of moving bodies 400 arriving at passing scheduled region 110 of sidewalk region 100 during a time from entry of vehicle 500 to sidewalk region 100 until lapse of the estimated crossing time. The estimated number of waiting bodies is, namely, an estimation value of a number of moving bodies 400 the passage of which is hindered in a case where vehicle 500 has started crossing of sidewalk region 100 at the current time, and is a value obtained by adding, to the estimation time, a time required for vehicle 500 to stay in sidewalk region 100 due to a state of roadway region 200.

Further, entry determination unit 620, based on the estimated number of waiting bodies thus calculated, determines a first threshold to be compared with the estimated crossing time. For example, entry determination unit 620 determines a first threshold having a smaller value, as the estimated number of waiting bodies is larger. This can achieve smooth passage of moving bodies 400 and smooth crossing of the vehicle in better balance.

In step S1500, entry determination unit 620 determines whether or not the estimated crossing time is less than or equal to the first threshold. Entry determination unit 620 advances processing to step S1700 described below, in a case where the estimated crossing time exceeds the first threshold (NO in step S1500). Further, entry determination unit 620 advances processing to step S1600, in a case where the estimated crossing time is less than or equal to the first threshold (YES in step S1500).

In step S1600, entry determination unit 620 determines whether or not the estimated number of waiting bodies is less than or equal to a preset third threshold (for example, 5). Entry determination unit 620 advances processing to step S1700, in a case where the estimated number of waiting bodies exceeds the third threshold (NO in step S1600). Further, entry determination unit 620 advances processing to step S1800 described below, in a case where the estimated number of waiting bodies is less than or equal to the third threshold (YES in step S1600).

In step S1700, entry determination unit 620 determines that the sidewalk entering operation is incapable at least at the current time. As a result, signal output unit 630 outputs a control signal that stops vehicle 500 in stopping region 300.

On the other hand, in step S1800, entry determination unit 620 determines that the sidewalk entering operation is possible at least at the current time. As a result, signal output unit 630 outputs a control signal that makes vehicle 500 enter sidewalk region 100.

Then, in step S1900, information acquisition unit 610 determines whether or not end of processing has been instructed by a user operation or the like. Information acquisition unit 610 returns processing to step S1100, in a case where end of processing is not instructed (NO in S1900). Information acquisition unit 610 ends a series of processing, in a case where end of processing has been instructed (YES in S1900).

With such an operation, vehicle state determination device 600 can sequentially determine, in a case where vehicle 500 is made to enter sidewalk region 100, whether or not a level (time or number) to hinder passage of moving bodies 400 is large. Then, vehicle state determination device 600 can make vehicle 500 enter sidewalk region 100 at a timing when the hindrance level is small, that is, at an appropriate timing.

Note that, an order of each processing is not limited to the above example. For example, processing in steps S1500 and S1600 may be performed in the reverse order.

<Effects of the Present Exemplary Embodiment>

As described above, vehicle state determination device 600 according to the present exemplary embodiment is a device that determines a state of vehicle 500 trying to enter roadway region 200 adjacent to sidewalk region 100 by crossing sidewalk region 100 in which moving bodies 400 pass through. Vehicle state determination device 600 has an input unit (information acquisition unit 610) that receives sidewalk information indicating a state of sidewalk region 100 and roadway information indicating a state of roadway region 200. In addition, vehicle state determination device 600 has a controller (entry determination unit 620 and signal output unit 630) that determines, based on the sidewalk information and the roadway information, whether or not a sidewalk entering operation in which vehicle 500 enters sidewalk region 100 is possible, and outputs a predetermined control signal that controls an operation of vehicle 500 depending on whether or not the sidewalk entering operation is possible.

Thereby, vehicle state determination device 600 according to the present exemplary embodiment can make vehicle 500 perform the sidewalk entering operation at an appropriate timing and enables vehicle 500 to cross sidewalk region 100 quickly with minimum hindrance to passage of moving body 400 in sidewalk region 100.

<Variation of the Present Exemplary Embodiment>

Note that, a predetermined control signal that signal output unit 630 outputs is not limited to the above example. For example, signal output unit 630, in a case where the sidewalk entering operation is determined to be possible, may output a control signal that instructs output of information indicating that the sidewalk entering operation is possible to vehicle 500. Alternatively, signal output unit 630, in a case where the sidewalk entering operation is determined not to be possible, may output a control signal that instructs output of information indicating that the sidewalk entering operation is not possible to vehicle 500.

Note that, the instruction of output of information to vehicle 500 is, for example, to instruct output of an image, a character, an audio, or the like that urges an operation of the sidewalk entering operation or avoidance of the operation to an information output device (HMI: Human-Machine Interface) for a user, such as a display or a speaker provided in vehicle 500.

In addition, the number of moving bodies 400 may be a value corresponding to density of moving bodies 400 in sidewalk region 100, such as a number of moving bodies 400 per unit area (for example, 1 $m^2$) in sidewalk region 100 (passing scheduled region 110). Further, the number of moving bodies 400 may be a value obtained by weighting a count value (or density) according to the location, such as counting relatively largely the number of moving bodies 400 located closer to stopping region 300 and/or passing scheduled region 110. The density of moving bodies 400 in sidewalk region 100 can be obtained, for example, by counting the number of moving bodies 400 located in each of a plurality of partitions obtained by partitioning sidewalk region 100 in a matrix such that one partition has a unit area.

In addition, each of the first to third thresholds may be a value that changes according to various conditions, such as a width of sidewalk region 100, a type of the sidewalk region, and/or a degree of urgency of crossing of vehicle 500. For example, in a case where the width of sidewalk region 100 is sufficiently larger than the length of vehicle 500, even if vehicle 500 has stopped before reaching roadway region 200, moving bodies 400 can pass a rear region of vehicle 500. Therefore, the above each threshold can be made higher compared with a case where the width of sidewalk region 100 is small.

In addition, vehicle state determination device 600 may determine whether or not the sidewalk entering operation is possible by further combining the above conditions with other conditions. For example, entry determination unit 620 may determine that the sidewalk entering operation is not possible in a case where a speed of moving body 400 arriving at passing scheduled region 110 during the estimated crossing time exceeds a fourth threshold (for example, 3 m/sec). Conversely, vehicle state determination device 600 may not use a part of the above plurality of conditions, such as not considering the estimated number of arriving bodies, the estimated crossing time, and/or the estimated number of waiting bodies.

In addition, entry determination unit 620 does not necessarily have to calculate the estimated crossing time. For example, entry determination unit 620 preliminarily holds a predetermined roadway state pattern in which the estimated crossing time is estimated to exceed the first threshold. Then, entry determination unit 620 determines whether or not the state of roadway region 200 that the roadway information indicates corresponds to the predetermined roadway state pattern. When the state corresponds to the predetermined roadway state pattern, entry determination unit 620 may determine that the estimated crossing time exceeds the first threshold, and when the state does not correspond to the predetermined roadway state pattern, entry determination unit 620 may determine that the estimated crossing time is less than or equal to the first threshold. For example, entry determination unit 620 determines that the estimated crossing time exceeds the first threshold while traffic signal 220 of roadway region 200 indicates a yellow signal to a red signal.

In addition, sidewalk region 100 that vehicle 500 aims to cross is not limited to the above example. Sidewalk region 100 may be any region in which some moving body passes through and which vehicle 500 is permitted to cross at any timing in a range where safety of vehicle 500 is ensured, and, for example, may be a pedestrian crossing or a roadway (a moving body in this case is a vehicle or the like). In addition, stopping region 300 where vehicle 500 is located before crossing sidewalk region 100 and roadway region 200 where vehicle 500 will be located after crossing are also not limited to the above-described parking lot or roadway. For example, stopping region 300 may be a roadway, and roadway region 200 may be a parking lot.

Further, vehicle state determination device 600 is not necessarily mounted in vehicle 500 that is a target of determination on whether or not the sidewalk entering operation is possible, and, for example, may be arranged in a server on the Internet. In this case, vehicle state determination device 600 needs to include a communication unit for communicably connecting, by wireless communication or the like, with each of recognition device 510 and vehicle control device 520 mounted in vehicle 500 concerned. A part of the configuration of vehicle state determination device 600 may be physically separated from the other parts of the configuration of the device. In this case, a plurality of the separated parts need to include communication units for mutual communication, respectively.

<Summary of the Present Disclosure>

The vehicle state determination device of the present disclosure is the one that determines a state of a vehicle trying to enter a roadway region adjacent to a sidewalk region by crossing the sidewalk region in which the moving body passes through, and has a following configuration. That is, the vehicle state determination device includes an input unit that receives sidewalk information indicating a state of the sidewalk region and roadway information indicating a state of the roadway region, and a controller that determines whether or not a sidewalk entering operation in which a vehicle enters the sidewalk region is possible, based on the sidewalk information and the roadway information, and outputs a predetermined control signal for controlling an operation of the vehicle depending on whether or not the sidewalk entering operation is possible.

Note that, in the above vehicle state determination device, the controller, based on the roadway information, may determine whether or not the estimated crossing time that is an estimation value of the minimum time from entry of the vehicle to the sidewalk region until exit from the sidewalk region is less than or equal to a first threshold, and may determine that the sidewalk entering operation is possible under the condition that the estimated crossing time is less than or equal to the first threshold.

In the above vehicle state determination device, the sidewalk information may indicate a location, a moving direction, and a moving speed of each of one or a plurality of moving bodies located in the sidewalk region. Further, the roadway information may indicate at least one of a location, a moving direction, and a moving speed of each of one or a plurality of other vehicles located in the roadway region, distances between vehicles and density of the plurality of other vehicles, and an indication state of a traffic signal disposed in the roadway region.

In the above vehicle state determination device, the controller may determine whether or not a state of the roadway region indicated by the roadway information corresponds to a predetermined roadway state pattern in which the estimated crossing time is estimated to exceed the first threshold, and determine that the estimated crossing time is less than or equal to the first threshold under the condition that the state of the roadway region does not correspond to the predetermined roadway state pattern.

In the above vehicle state determination device, the controller may calculate the estimated crossing time based on the roadway information, and determine whether or not the sidewalk entering operation is possible by comparing the estimated crossing time thus calculated with the first threshold.

In the above vehicle state determination device, the controller may calculate, based on the sidewalk information, an estimated number of arriving bodies that is an estimation value of a number of the moving bodies arriving at a passing scheduled region of the vehicle in the sidewalk region while the vehicle crosses the sidewalk region without stopping, and determine that the sidewalk entering operation is possible under the condition that the estimated number of arriving bodies thus calculated is less than or equal to a second threshold.

In the above vehicle state determination device, the controller may calculate, based on the sidewalk information, an estimated number of waiting bodies that is an estimation value of a number of the moving bodies arriving at a passing scheduled region of the vehicle in the sidewalk region during a time from entry of the vehicle to the sidewalk region until lapse of the estimated crossing time, and determine that the sidewalk entering operation is possible under the condition that the estimated number of waiting bodies thus calculated is less than or equal to a third threshold.

In the above vehicle state determination device, the controller may calculate, based on the sidewalk information, an estimated number of waiting bodies that is an estimation value of a number of the moving bodies arriving at a passing scheduled region of the vehicle in the sidewalk region during a time from entry of the vehicle to the sidewalk region until lapse of the estimated crossing time, and change the first threshold depending on the estimated number of waiting bodies thus calculated.

In the above vehicle state determination device, the predetermined control signal may include at least one of a control signal that instructs the sidewalk entering operation to the vehicle, a control signal that instructs prohibition of the sidewalk entering operation to the vehicle, a control signal that instructs output of information indicating that the sidewalk entering operation is possible to the vehicle, and a control signal that instructs output of information indicating that the sidewalk entering operation is not possible to the vehicle.

A vehicle information determination method of the present disclosure is a vehicle state determination method that determines a state of a vehicle trying to enter a roadway region adjacent to a sidewalk region by crossing the sidewalk region in which a moving body passes through, and has following steps. That is, the method includes a step of receiving sidewalk information indicating a state of the sidewalk region and roadway information indicating a state of the roadway region, and a step of determining whether or not a sidewalk entering operation in which a vehicle enters the sidewalk region is possible, based on the sidewalk information and the roadway information, and a step of outputting a predetermined control signal that controls an operation of the vehicle depending on whether or not the sidewalk entering operation is possible.

A vehicle state determination program of the present disclosure is the one that determines a state of a vehicle trying to enter a roadway region adjacent to a sidewalk region by crossing the sidewalk region in which a moving body passes through, and makes following processing be executed. That is, the program causes a computer to execute processing of receiving sidewalk information indicating a state of the sidewalk region and roadway information indicating a state of the roadway region, and processing of determining whether or not a sidewalk entering operation in which a vehicle enters the sidewalk region is possible, based on the sidewalk information and the roadway information, and processing of outputting a predetermined control signal that controls an operation of the vehicle depending on whether or not the sidewalk entering operation is possible.

INDUSTRIAL APPLICABILITY

The vehicle state determination device, the vehicle state determination method, and the vehicle state determination program according to the present disclosure are useful as a vehicle state determination device, a vehicle state determination method, and a vehicle state determination program that enable a vehicle to quickly cross a sidewalk region with minimum hindrance to passage of a moving body in the sidewalk region.

REFERENCE MARKS IN THE DRAWINGS

100: sidewalk region
110: passing scheduled region
200: roadway region
210: other vehicle
220: traffic signal
300: stopping region
400: moving body
500: vehicle
600: vehicle state determination device
610: information acquisition unit
620: entry determination unit
630: signal output unit

The invention claimed is:

1. A vehicle state determination device, comprising:
an input configured to receive sidewalk information indicating a state of a sidewalk region through which a moving body passes and roadway information indicating a state of a roadway region, the sidewalk region extending along and adjacent the roadway region and being between a position where a vehicle is present and the roadway region; and
a controller configured to determine whether or not a sidewalk entering operation is possible based on the sidewalk information and the roadway information, the sidewalk entering operation being an operation in which the vehicle enters the sidewalk region for entering the roadway region by crossing the sidewalk region,
wherein the controller is configured to determine, based on the roadway information indicating the state of the roadway region, with the roadway region being on an opposite side of the position of the vehicle through the sidewalk region, whether or not an estimated crossing time is less than or equal to a first threshold, and determine that the sidewalk entering operation is possible under a condition that the estimated crossing time is less than or equal to the first threshold, the estimated crossing time being an estimation value of a minimum time from entry of the vehicle to the sidewalk region until exit from the sidewalk region, and
wherein the controller is configured to output at least one of a control signal that controls an operation of the vehicle or information that urges or avoids the sidewalk entering operation depending on whether the sidewalk entering operation is possible, the information that urges or avoids the sidewalk entering operation being output to at least one of a display or a speaker.

2. The vehicle state determination device according to claim 1, wherein
the sidewalk information indicates a location, a moving direction, and a moving speed of the moving body located in the sidewalk region, and
the roadway information indicates at least one of a location, a moving direction, and a moving speed of each of one or a plurality of other vehicles located in the roadway region, distances between each of the one or the plurality of the other vehicles, a density of the one or the plurality of the other vehicles, and an indication state of a traffic signal disposed in the roadway region.

3. The vehicle state determination device according to claim 2, wherein the controller is further configured to determine whether or not a state of the roadway region indicated by the roadway information corresponds to a predetermined roadway state pattern in which the estimated crossing time is estimated to exceed the first threshold, and determine that the estimated crossing time is less than or equal to the first threshold under a condition that the state of the roadway region does not correspond to the predetermined roadway state pattern.

4. The vehicle state determination device according to claim 2, wherein the controller is further configured to calculate the estimated crossing time based on the roadway information, and determine whether or not the sidewalk entering operation is possible by comparing the estimated crossing time with the first threshold.

5. The vehicle state determination device according to claim 4, wherein the controller is further configured to calculate, based on the sidewalk information, an estimated number of arriving bodies arriving at a passing scheduled region of the vehicle in the sidewalk region while the vehicle crosses the sidewalk region without stopping, and determine that the sidewalk entering operation is possible under a condition that the estimated number of the arriving bodies is less than or equal to a second threshold.

6. The vehicle state determination device according to claim 4, wherein the controller is further configured to calculate, based on the sidewalk information, an estimated number of waiting bodies arriving at a passing scheduled region of the vehicle in the sidewalk region during a time from entry of the vehicle to the sidewalk region until lapse of the estimated crossing time, and determine that the sidewalk entering operation is possible under a condition that the estimated number of the waiting bodies is less than or equal to a second threshold.

7. The vehicle state determination device according to claim 4, wherein the controller is further configured to calculate, based on the sidewalk information, an estimated number of waiting bodies arriving at a passing scheduled region of the vehicle in the sidewalk region during a time from entry of the vehicle to the sidewalk region until lapse of the estimated crossing time, and change the first threshold depending on the estimated number of the waiting bodies.

8. The vehicle state determination device according to claim 1,
wherein the controller is further configured to calculate an average time of intervals during which other vehicles pass an entry location to the roadway region, the entry location being on the opposite side of the position of the vehicle through the sidewalk region, and
the controller is configured to determine whether the sidewalk entering operation is possible based on the average time of the intervals during which the other vehicles pass the entry location.

9. The vehicle state determination device according to claim 1,
wherein the controller is further configured to calculate an average time of intervals during which other vehicles pass an entry location to the roadway region, the entry location being on the opposite side of the position of the vehicle through the sidewalk region, and
the controller is configured to determine the estimated crossing time based on the average time of the intervals.

10. The vehicle state determination device according to claim 9, wherein the controller is configured to increase the estimated crossing time as the average time of the intervals decreases.

11. The vehicle state determination device according to claim 10, wherein the controller is configured to decrease the estimated crossing time as the average time of the intervals increases.

12. A vehicle state determination method, comprising:
receiving sidewalk information indicating a state of a sidewalk region through which a moving body passes and roadway information indicating a state of a roadway region, the sidewalk region extending along and adjacent the roadway region and being between a position where a vehicle is present and the roadway region; and
determining whether or not a sidewalk entering operation is possible based on the sidewalk information and the roadway information, the sidewalk entering operation being an operation in which the vehicle enters the sidewalk region for entering the roadway region by crossing the sidewalk region, wherein, in the determining, whether or not an estimated crossing time is less than or equal to a first threshold is determined based on the roadway information indicating the state of the roadway region, with the roadway region being on an opposite side of the position of the vehicle through the sidewalk region, and the sidewalk entering operation is determined to be possible under a condition that the estimated crossing time is less than or equal to the first threshold, the estimated crossing time being an estimation value of a minimum time from entry of the vehicle to the sidewalk region until exit from the sidewalk region, and the vehicle state determination method further comprises outputting at least one of a control signal that controls an operation of the vehicle or information that urges or avoids the sidewalk entering operation depending on whether the sidewalk entering operation is possible, the information that urges or avoids the sidewalk entering operation being output to at least one of a display or a speaker.

* * * * *